(12) United States Patent
Bogdan et al.

(10) Patent No.: US 6,764,990 B1
(45) Date of Patent: Jul. 20, 2004

(54) AZEOTROPE-LIKE COMPOSITIONS OF PENTAFLUOROPROPANE, CHLOROPROPANE AND DICHLOROETHYLENE

(75) Inventors: Mary C. Bogdan, Buffalo, NY (US); Hang T. Pham, Amherst, NY (US); Gary M. Knopek, Lakeview, NY (US); Rajiv R. Singh, Getzville, NY (US); David J. Williams, Amherst, NY (US); Kane D. Cook, Eggertsville, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/455,120

(22) Filed: Jun. 4, 2003

(51) Int. Cl.[7] ............................................. C11D 17/00
(52) U.S. Cl. ...................... 510/408; 510/412; 510/415
(58) Field of Search ............................. 510/408, 412, 510/415

(56) References Cited

U.S. PATENT DOCUMENTS

| | | | |
|---|---|---|---|
| 2,834,748 A | | 5/1958 | Bailey |
| 2,846,458 A | | 8/1958 | Haluska |
| 2,917,480 A | | 12/1959 | Bailey |
| 5,320,683 A | * | 6/1994 | Samejima et al. ............ 134/40 |
| 5,523,333 A | * | 6/1996 | Fishback et al. ............ 521/131 |
| 5,895,793 A | * | 4/1999 | Kitamura et al. ............ 516/10 |
| 6,100,229 A | * | 8/2000 | Swan et al. ................. 510/408 |
| 6,514,928 B1 | * | 2/2003 | Bement et al. ............. 510/415 |

OTHER PUBLICATIONS

Saunders and Frisch, "Polyurethanes Chemistry and Technology," vols. I and II, John Wiley and Sons, New York, NY (1962).

* cited by examiner

Primary Examiner—John M. Cooney, Jr.
(74) Attorney, Agent, or Firm—Deborah M. Chess

(57) ABSTRACT

This invention provides azeotrope-like compositions of 1,1,1,3,3-pentafluoropropane, 2-chloropropane and dichloroethylene that are environmentally desirable for use as refrigerants, aerosol propellants, metered dose inhalers, blowing agents for polymer foam, heat transfer media, and gaseous dielectrics.

9 Claims, 1 Drawing Sheet

Ternary HFC-245fa/2-Chloropropane/Trans-1,2-dichloroethylene

US 6,764,990 B1

AZEOTROPE-LIKE COMPOSITIONS OF PENTAFLUOROPROPANE, CHLOROPROPANE AND DICHLOROETHYLENE

FIELD OF THE INVENTION

The present invention relates to azeotrope-like compositions of pentafluoropropane, chloropropane, and dichloroethylene, to methods of using such compositions, to blowing agents containing the compositions, and to blown foams formed using such compositions. More particularly, the present invention relates to azeotrope-like compositions of 1,1,1,3,3-pentafluoropropane, 2-chloropropane and dichloroethylene.

BACKGROUND

Fluorocarbon based fluids have found widespread use in industry in a number of applications, including, as refrigerants, aerosol propellants, blowing agents, heat transfer media, and gaseous dielectrics. Because of the suspected environmental problems associated with the use of some of these fluids, especially chlorofluorocarbons ("CFCs"), it is desirable to use fluids of lesser ozone depletion potential such as hydrofluorocarbons, ("HFCs") and/or hydrochlorofluorocarbons ("HCFCs").

Thus, the use of fluids that do not contain CFCs or contain HCFCs or HFCs instead of CFCs, is desirable. Additionally, it is known that the use of single component fluids or azeotropic mixtures, which mixtures do not fractionate on boiling and evaporation, is preferred in many application, including as blowing agents for the production of rigid foams. Known methods for producing rigid foams generally comprise reacting an organic polyisocyanurate and a polyol in the presence of a blowing agent to form a rigid foam. See, for example, Saunders and Frisch, Volumes I and II Polyurethanes Chemistry and Technology (1962), which is incorporated herein by reference.

However, the identification of new, environmentally safe, azeotropic mixtures, particularly those well suited for use as blowing agents, is complicated due to the fact that azeotrope formation is not readily predicatble.

DETAILED DESCRIPTION OF PREFERRED EMBODIMENTS

The present inventors have developed several compositions that can help to satisfy the continuing need for substitutes for CFCs and HCFCs. In one embodiment, the present invention provides azeotrope-like compositions comprising 1,1,1,3,3-pentafluoropropane ("HFC-245fa"), 2-chloropropane, and dichlorethylene.

The preferred compositions of the invention provide environmentally desirable replacements for currently used CFC's and HCFC's. Additionally, the compositions of the invention exhibit characteristics that make the compositions better CFC and HCFC substitutes than any of 1,1,1,3,3-pentafluoropropane, 2-chloropropane and dichlorethylene alone.

One aspect of the invention provides a method for producing foams, preferably foams with relatively low k-factors. Applicants have discovered that methods for producing foams advantageously include providing to a foamable reaction mixture the azeotropic composition of the present invention as a blowing agent for the foamable mixture. Such methods, in preferred embodiments, produce rigid foams having desirably low k-factors. As used herein, the term "foamable" reaction mixture refers to one or more compounds which, in the presence of a blowing agent, are capable of reacting to form a rigid foam. Another aspect of the present invention is a closed-cell foam produced according to the methods of the present invention.

THE COMPOSITIONS

The present compositions are azeotrope-like compositions. As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the state pressure and temperature. In practice, this means that the components of an azeotropic mixture are constant boiling and cannot be separated during a phase change.

As the term is used herein, "azeotrope-like" compositions behave like azeotropic mixtures, that is, they are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

The azeotrope-like compositions of the invention may include additional components that do not form new azeotropic or azeotrope-like systems, or additional components that are not in the first distillation cut. The first distillation cut is the first cut taken after the distillation column displays steady state operation under total reflux conditions. One way to determine whether the addition of a component forms a new azeotropic or azeotrope-like system so as to be outside of this invention is to distill a sample of the composition with the component under conditions that would be expected to separate a non-azeotropic mixture into its separate components. If the mixture containing the additional component is non-azeotropic or non-azeotrope-like, the additional component will fractionate from the azeotropic or azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that arc azeotrope-like. All such compositions are intended to be covered by the term azeotrope-like as used herein.

The present invention provides azeotrope and azeotrope-like compositions comprising 1,1,1,3,3-pentafluoropropane, 2-chloropropane and dichloroethylene. Preferably, the novel azeotrope-like compositions of the present invention comprise effective amounts of 1,1,1,3,3-pentafluoropropane, 2-chloropropane, and dichloroethylene, preferably 1,2-dichloroethylene, and even more preferably trans-1,2-dichloroethylene. The term "effective amounts" as used herein refers to the amount of each component which upon combination with the other component or components, results in the formation of the present azeotrope-like compositions.

These embodiments preferably provide azeotrope-like compositions comprising, and preferably consisting essentially of, from about 10 to about 99 parts by weight HFC-245fa, from about 1 to about 90 parts by weight of 2-chloropropane, and from about 1 to about 40 parts by weight of dichloroethylene. More preferably the azeotrope-like compositions of the present invention comprise, and preferably consist essentially of, from about 50 to about 99 parts by weight HFC-245fa, from about 1 to about 20 parts by weight of 2-chloropropane, and from about 1 to about 20 parts by weight of dichloroethylene. And even more preferably the azeotrope-like compositions of the present invention comprise, and preferably consist essentially of, from about 85 to about 99 parts by weight HFC-245fa, from about 1 to about 20 parts by weight of 2-chloropropane, and from about 1 to about 20 parts by weight of dichloroethylene.

BRIEF DESCRIPTION OF DRAWING

The preferred compositions of the present invention are characterized by a boiling point of about 14.428° C.±4° C., preferably ±2° C., more preferably ±1° C. at 14.46 psia. The boiling point plot for such embodiments is illustrated in FIG. 1. Table 1 presented below in connection with Example 1 provides boiling point data for compositions according to preferred embodiments of the present invention.

USES OF THE COMPOSITIONS

Figure 1:
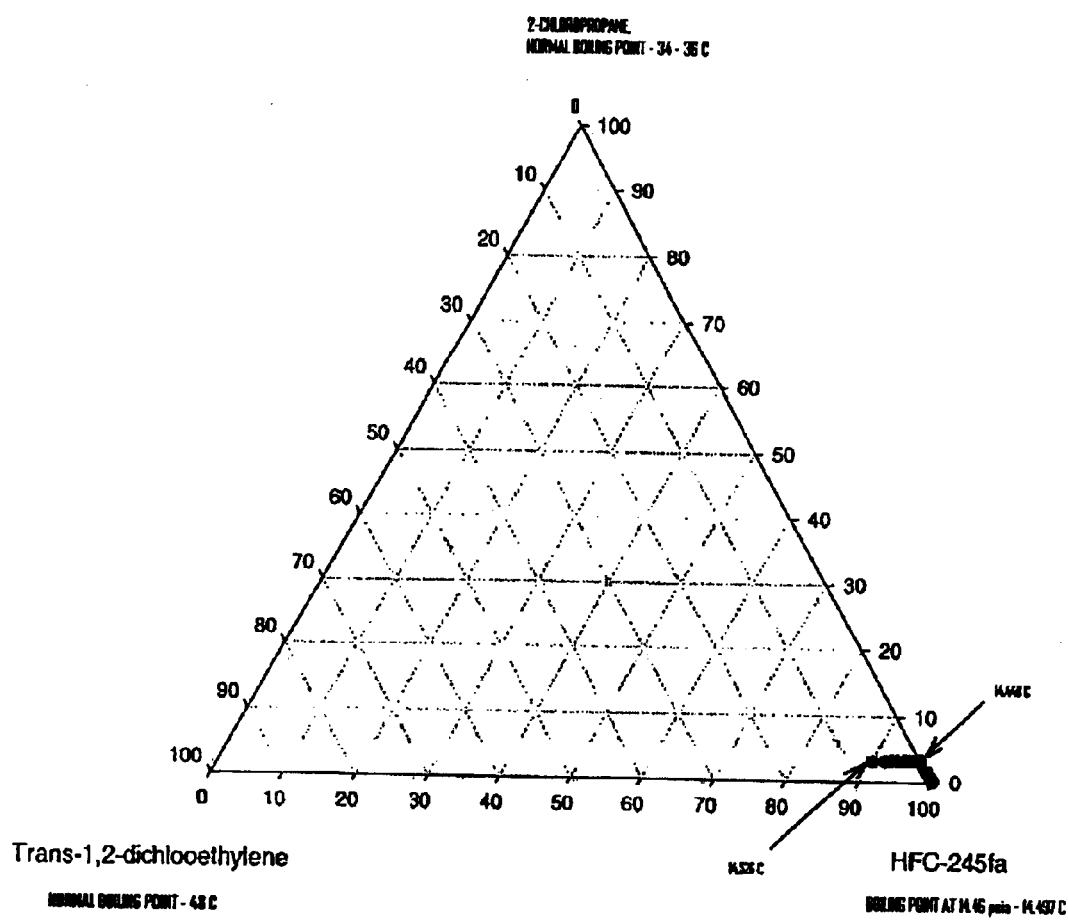

The compositions of the present invention may be used in a wide variety of applications as substitutes for CFCs and HCFCs. For example, the present compositions are useful as solvents, blowing agents, refrigerants, cleaning agents and aerosols.

One embodiment of the present invention relates to a blowing agent comprising one or more of the azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. The present methods preferably comprise providing such a foamable composition and reacting it under conditions effective to obtain a foam, and preferably a closed cell foam. The invention also relates to foam, and preferably closed cell foam, prepared from a polymer foam formulation containing a blowing agent comprising the azeotrope-like composition of the invention.

Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives. It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B-component as described above.

It is also possible to produce thermoplastic foams using the compositions of the invention. For example, conventional foam polyurethanes and isocyanurate formulations may be combined with the azeotrope-like compositions in a conventional manner to produce rigid foams.

Azeotrope-like mixtures containing HFC-245fa in accordance with the present invention are particularly suitable as foam blowing agents since foams blown with HFC-245fa have been found to possess low relative initial and aged thermal conductivity and good dimensional stability at low temperatures. Of particular interest are those azeotrope-like compositions of the present invention that optionally further contain other zero ozone depleting materials, such as, for example, other hydrofluorocarbons, e.g., difluoromethane (HFC-32); difluoroethane (HFC-152); trifluoroethane (HFC-143); tetrafluoroethane (HFC-134); pentafluoroethane (HFC-125); pentafluoropropane (HFC-245); hexafluoropropane (HFC-236); heptafluoropropane (HFC-227); pentafluorobutane (HFC-365) and inert gases, e.g., air, nitrogen, carbon dioxide. Where isomerism is possible for the hydrofluorocarbons mentioned above, the respective isomers may be used either singly or in the form of a mixture.

Dispersing agents, cell stabilizers, and surfactants may also be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917, 480, and 2,846,458. Other optional additives for the blowing agent mixture may include flame retardants such as tri(2-chloroethyl)phosphate, tri(2-chloropropyl)phosphate, tri(2,3-dibromopropyl)-phosphate, tri(1,3-dichloropropyl) phosphate, diammonium phosphate, various halogenated aromatic compounds, antimony oxide, aluminum trihydrate, polyvinyl chloride, and the like. In another embodiment, the azeotrope-like compositions of this invention may be used as propellants in sprayable compositions, either alone or in combination with known propellants. The sprayable composition comprises, consists essentially of, and consists of a material to be sprayed and a propellant comprising, consisting essentially of, and consisting of the azeotrope-like compositions of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

The components of the composition of the invention are known materials that are commercially available or may be prepared by known methods. Preferably, the components are of sufficiently high purity so as to avoid the introduction of adverse influences upon cooling or heating properties, constant boiling properties, or blowing agent properties of the system. In the case of metered dose inhalers, the relevant current Good Manufacturing Process may be used for manufacturing these materials.

Additional components may be added to tailor the properties of the azeotrope-like compositions of the invention as needed. By way of example, oil solubility aids may be added in the case in which the compositions of the invention are used as refrigerants. Stabilizers and other materials may also be added to enhance the properties of the compositions of the invention.

EXAMPLES

Example 1

An ebulliometer consisting of vacuum jacketed tube with a condenser on top was used. HFC-245fa (25.24 g) is charged to the ebulliometer and 2-chrloropropane is added thereto in small measured increments at 14.46 psia. The associated temperature change is observed and recorded. Subsequently, trans-1,2-dichloroethylene is added in small, measured increments at 14.46 psia. Temperature depression is observed when trans-1,2-dichloroethylene is added to HFC-245fa/2-chloropropane, indicating that a ternary minimum boiling azeotrope is formed. From about 0.25 to about 7 weight percent of trans-1,2-dichloroethylene, the boiling point of the composition changes by about 0.1° C. at 14.46 psia. Therefore, the composition exhibits azeotrope and/or azeotrope-like properties over this range as illustrated by Table 1 below.

TABLE 1

| | Barometer = 14.46 psia | | |
|---|---|---|---|
| Wt. % 245fa | Wt. % 2-Chloropropane | Wt. % trans1,2DCE | T (C) |
| 100.00 | 0.00 | 0.00 | 14.497 |
| 99.83 | 0.17 | 0.00 | 14.487 |
| 99.50 | 0.50 | 0.00 | 14.477 |
| 99.17 | 0.99 | 0.00 | 14.467 |
| 98.51 | 1.49 | 0.00 | 14.458 |
| 97.86 | 2.14 | 0.00 | 14.458 |
| 97.22 | 2.78 | 0.00 | 14.448 |
| 96.58 | 3.42 | 0.00 | 14.448 |
| 96.35 | 3.41 | 0.24 | 14.448 |
| 95.88 | 3.39 | 0.73 | 14.438 |
| 95.42 | 3.37 | 1.21 | 14.438 |

TABLE 1-continued

| | Barometer = 14.46 psia | | |
|---|---|---|---|
| Wt. % 245fa | Wt. % 2-Chloropropane | Wt. % trans1,2DCE | T (C) |
| 94.50 | 3.34 | 2.16 | 14.428 |
| 93.60. | 3.31 | 3.09 | 14.428 |
| 92.72 | 3.28 | 4.00 | 14.448 |
| 91.86 | 3.25 | 4.89 | 14.507 |
| 91.18. | 3.19 | 6.63 | 14.526 |

Example 2

One hundred (100) g of a polyether with a hydroxyl value of 380, a result from the addition of propylene oxide to a solution of saccharose, propylene glycol and water, is mixed with 2 g of a siloxane polyether copolymer as foam stabilizer, and 3 g of dimethylcyclohexylamine. With stirring, 100 g of the mixture is thoroughly mixed with 15 g of an azeotrope-like composition of Example 1 as blowing agent. The resulting mixture is foamed with 152 g of crude 4,4' diisocyanatodiphenylmethane. The resulting rigid foam is inspected and found to be of good quality.

What is claimed is:

1. An azeotrope-like composition consisting essentially of from about 1 to about 40 weight percent trans-1,2-dichloroethylene, from about 1 to about 90 weight percent 2-chloropropane and from about 10 to about 99 weight percent HFC-245fa.

2. The azeotrope-like compositions of claim 1 characterized by a boiling point of about 14.43° C.±4° C. at about 14.46 psia.

3. The azeotrope-like compositions of claim 2 wherein said composition consists essentially of from about 1 to about 20 weight percent trans-1,2-dichloroethylene, from about 1 to about 20 weight percent 2-chlropropane and from about 50 to about 99 weight percent HFC-245fa characterized by a boiling point of about 14.29° C.±4° C. at about 14.4 psia.

4. The azeotrope-like compositions of claim 1 consisting essentially of from about 1 to about 20 weight percent trans-1,2-dichloroethylene, from about 1 to about 20 weight percent 2-chlropropane and from about 50 to about 99 weight percent HFC-245 fa.

5. The azeotrope-like compositions of claim 1 consisting essentially of from about 1 to about 20 weight percent trans-1,2-dichloroethylene, from about 1 to about 20 weight percent 2-chlropropane and from about 85 to about 99 weight percent HFC-245 fa.

6. A blowing agent composition comprising the azeotrope-like compositions of claim 1.

7. A blowing agent composition comprising the azeotrope-like compositions of claim 4.

8. A blowing agent composition comprising the azeotrope-like compositions of claim 5.

9. An azeotrope-like compositions comprising from about 1 to about 40 weight percent trans-1,2-dichloroethylene, from about 1 to about 90 weight percent 2-chloropropane and front about 10 to about 99 weight percent HFC-245 fa.

* * * * *